United States Patent [19]

Henseleit et al.

[11] Patent Number: 4,489,522
[45] Date of Patent: Dec. 25, 1984

[54] METHOD AND DEVICE FOR THE STORAGE OF SELECTED POINTS OF A NOMINAL CONTOUR LINE IN A PROJECTION PROFILE GRINDER

[75] Inventors: Roland Henseleit, Wertheim; Carl-Joachim Kolb, Külsheim-Tiefental, both of Fed. Rep. of Germany

[73] Assignee: Präzisions-Technik GmbH, Wertheim, Fed. Rep. of Germany

[21] Appl. No.: 416,529

[22] Filed: Sep. 9, 1982

[30] Foreign Application Priority Data

Sep. 12, 1981 [DE] Fed. Rep. of Germany ....... 3136241

[51] Int. Cl.³ .............................................. B24B 49/12
[52] U.S. Cl. ............................... 51/165.71; 51/165.72; 51/281 R; 353/42; 364/474
[58] Field of Search ......... 51/165.72, 165.71, 165 TP, 51/281 R; 353/42; 364/424

[56] References Cited

U.S. PATENT DOCUMENTS

| 2,145,116 | 1/1939 | Howard | 51/165.72 |
| 2,378,401 | 6/1945 | Gardner | 51/165.72 |
| 2,553,099 | 5/1951 | Lowber | 51/165.72 |
| 2,957,389 | 10/1960 | Moore | 353/42 |
| 3,507,075 | 4/1970 | Schmidt | 51/165.72 |
| 3,812,630 | 5/1974 | Walser | 51/165.72 |
| 4,167,082 | 9/1979 | Klob | 51/165.72 |

Primary Examiner—Harold D. Whitehead
Attorney, Agent, or Firm—Stephenson and Boller

[57] ABSTRACT

Method and device for storing selected points of a nominal contour line plotted on the projection screen of a projection profile grinder for the control of the grinding wheel position when a profile corresponding to the nominal contour line is ground into a workpiece.

10 Claims, 4 Drawing Figures

METHOD AND DEVICE FOR THE STORAGE OF SELECTED POINTS OF A NOMINAL CONTOUR LINE IN A PROJECTION PROFILE GRINDER

BACKGROUND AND SUMMARY OF THE INVENTION

The invention concerns a method for storing selected points of a nominal contour line plotted on the projection screen of a projection profile grinder for the control of the grinding wheel position when a profile corresponding to the nominal contour line is ground into a workpiece.

In a projection profile, grinder, the image of a grinding wheel, having a controllable position, and of a workpiece to be machined by it, in the engagement zone appears magnified via a projection beam on a projection screen over which a transparent overlay with a tracing of a nominal contour line is placed. By a suitable position control of the grinding wheel, for example, by means of a compound table, it is possible to control the grinding wheel in such a manner that the workpiece is ground according to the nominal contour line. This can be observed exactly on the screen, since in the ideal case, the boundary between dark (workpiece) and light (transmitted light) coincides with the nominal contour line.

For the grinding process, the respective position of the grinding wheel can be determined by an electronic control system, for example, a CNC system, which moves the holder of the grinding wheel, for example, via the slides of a compound table which are moved by servomotors.

Up until now, it has been customary to enter single control points numerically via a keyboard, a punched tape or of nominal contour line data. Data acquisition is extremely time-consuming in this process.

This invention is based on the objective to provide a method and device by means of which the input of a nominal contour curve into the control system of a projection profile grinder can be accelerated and its precision improved.

In a method of the type described initially, this objective is realized according to the invention by the fact that the image of a marker mounted on the holder of the grinding wheel projected on the projection screen is moved along the nominal contour line by moving the holder and the position of the holder is stored when the silhouette of the marker points to the selected points of the nominal contour line traced on the screen.

In a device for the realization of this process, the objective is achieved by the fact that a marker which can be imaged on the projection screen of the projection system is mounted on the holder for the grinding wheel of a projection profile grinder.

The marker has a precisely defined position relative to the engagement site of the grinding wheel, so that when the marker is imaged, for example, on the origin of the nominal contour line on the screen, the exact location of the grinding wheel relative to the origin of the profile actually to be machined into the workpiece is also known. Thus, by a precisely known displacement of the grinding wheel which corresponds to the distance between grinding wheel and marker, it is possible to move the grinding wheel exactly into the origin of the profile to be ground.

The same applies to any other point specifically identified on the nominal contour line, for example, by punching perforations on the overlay carrying the nominal contour line. As soon as the marker points to such a selected point on the screen, the position data of the overlay corresponding to this location are stored and this procedure is performed for a larger number of selected points along the nominal contour line until the important characteristics of the nominal contour line are stored in the form of numerical data in the control unit. With all of these data, it must be kept in mind that during recording the grinding wheel was still located a defined distance from the engagement site, but this additional displacement is the same in all points, so that it can be readily taken into account in the subsequent control of the grinding wheel.

The greatest advantage in this process in particular is that the high magnification of the projection beam allows an extraordinarily precise position determination of the carrier so that extremely high precision is obtained. Moreover, tracing of the nominal contour line can be realized very simply by manually adjusting the displacement of the carrier as is the custom of the operating personnel of projection profile grinders in the direct machining of workpieces.

It is of advantage for the marker to be movable between a first position in which it submerges in the beam path of the projection system and a second position in which it is removed from the beam path. In the second position, the marker therefore does not interfere with the machining process. Preferably the marker can be moved between the two positions by an electrical motor or a mechanical drive, where it is of advantage for this drive to be operable by the control system itself.

In a preferred practical version, provision is made for the marker to be a holder holding a transparent reticle with cross-hairs or a partially transparent or opaque disk with a small hole allowing transmission of the projection light and having a diameter of preferably 0.1 mm. This allows a particularly precise reading of the marker position on the screen; thus, with a magnification of 50× of the projection beam and a hole of 0.1 mm diameter in an opaque disk, the positioning precision obtained is in the order of 1-2 $\mu$m.

BRIEF DESCRIPTION OF THE DRAWINGS

The following description of preferred practical versions together with the drawing serves for a more detailed explanation, where.

DETAILED DESCRIPTION

Figure 1:
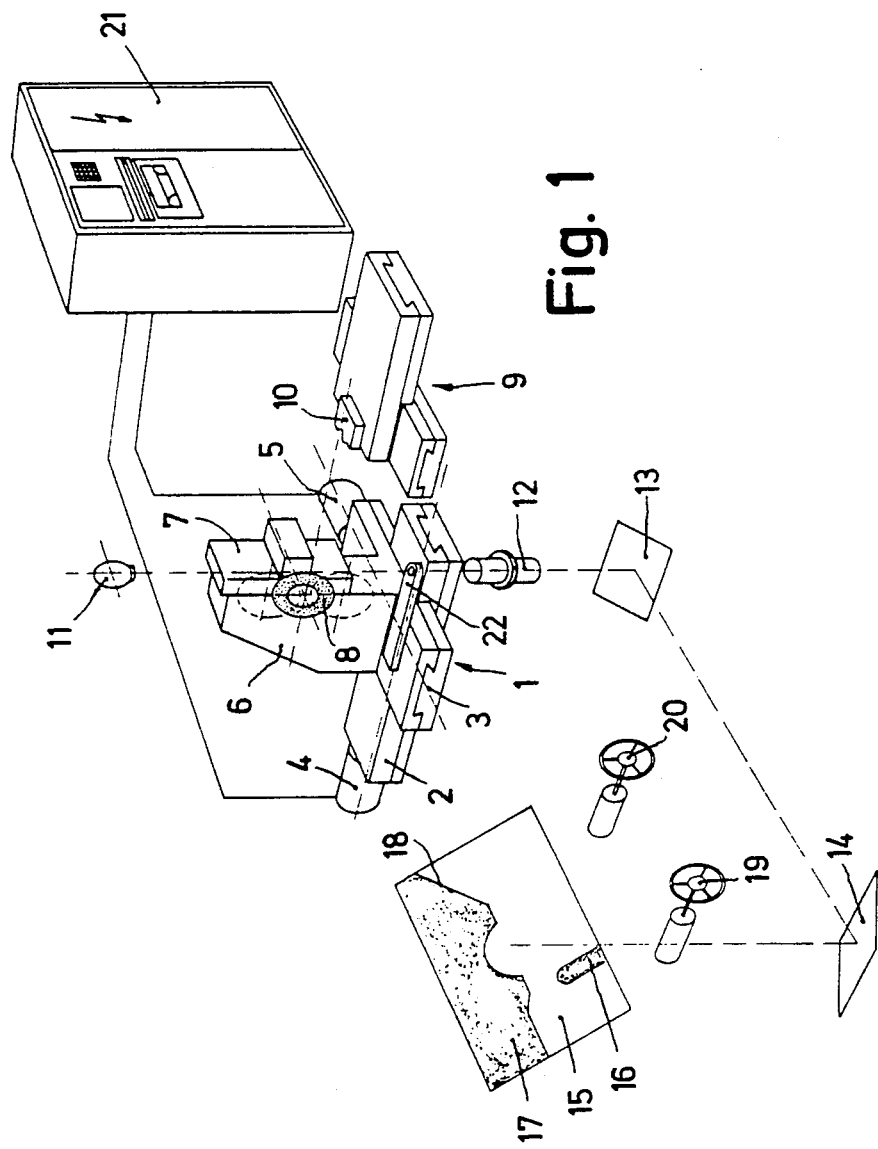
FIG. 1 is a schematic view in perspective of the most important parts of a projection profile grinder.
Figure 2:
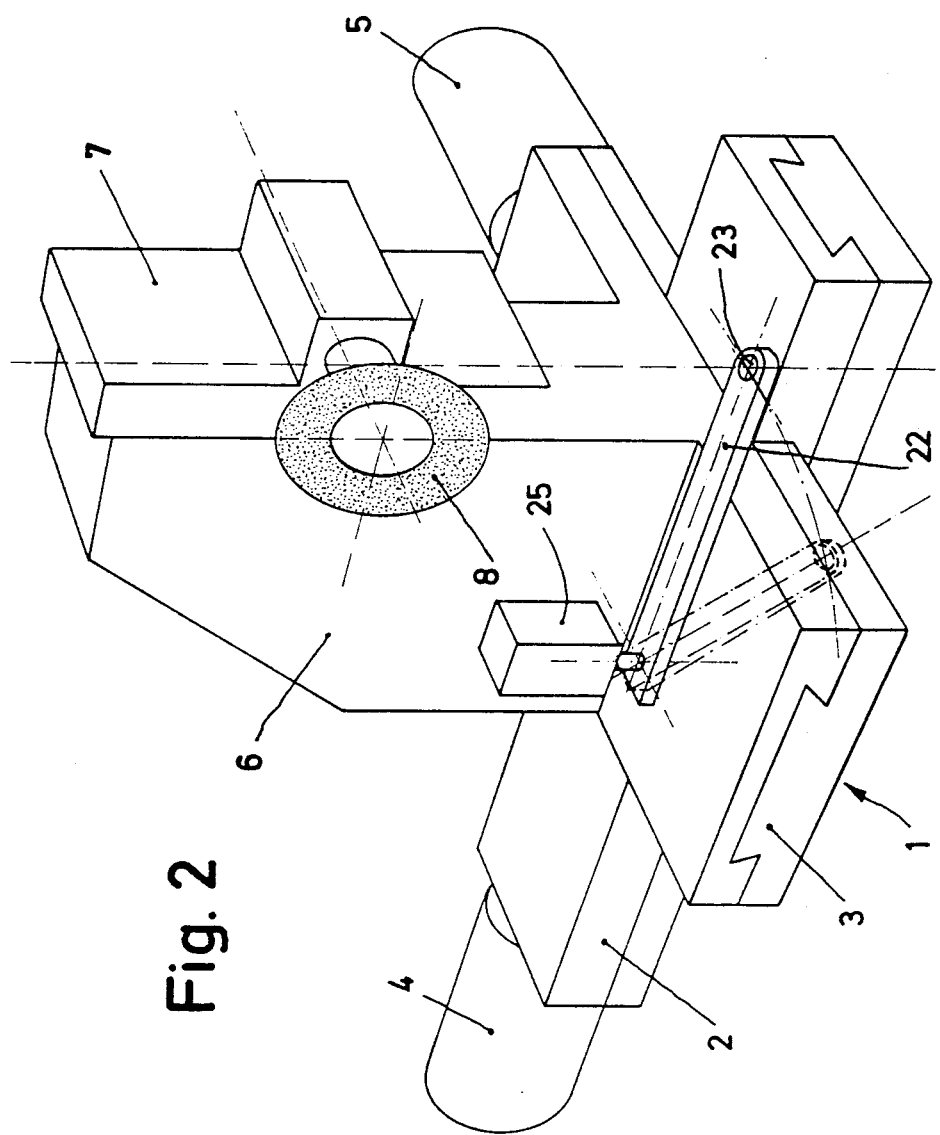
FIG. 2 is a magnified partial view in perspective of the projection profile grinder shown in FIG. 1.

On a compound table 1 of a projection profile grinder with two slides 2 and 3, which can be displaced perpendicular to each other by means of servomotors 4 and 5, respectively, a carrier 6 is located on the upper carriage 3 carrying a holder 7 which is displaceable in the vertical direction and on which a rotatable and mechanically driven grinding wheel 8 is mounted on a horizontal shaft (FIGS. 1 and 2). A second compound table 9 carries the workpiece 10 which can be caused to engage with the grinding wheel by moving one or both of the compound tables.

Figure 4:
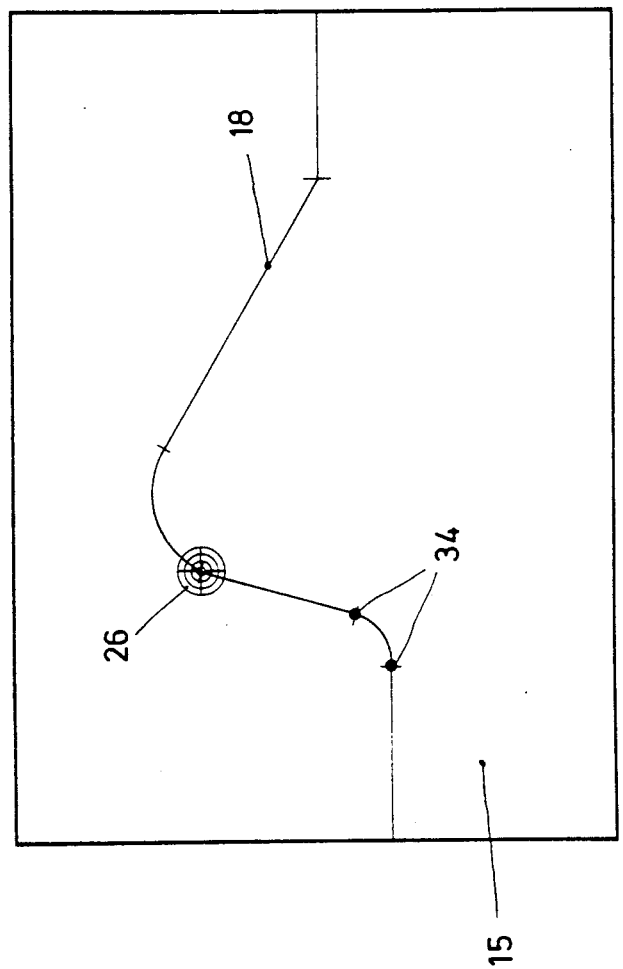
FIG. 4 is a schematic diagram of the projection screen with a nominal contour line and the image of the marker.

The engagement site is projected by means of a projection beam which includes a light source 11, a projection lens 12 as well as two deflection mirrors 13 and 14, on a projection screen 15 on which image 16 of the grinding wheel and image 17 of the workpiece are reproduced. A nominal contour curve 18 which marks the profile which the workpiece is to exhibit after machining (FIG. 4) is traced on the screen either directly or by means of a transparent overlay.

For machining of the workpiece, slides 2 and 3 of compound table 1 can be adjusted manually via handwheels 19 and 20 or via a CNC system 21 and servomotors 4 and 5.

Moreover, a holder 22 which can be swung around a vertical axis and the free end of which has an opening 23 for the insertion of disks 24 of different design is positioned on the upper slide 3 holding carrier 6 (FIG. 2). With an electrical motor drive 25, the holder can be moved into a first position shown in a solid line in FIG. 2 in which the opening with the inserted disk 24 is located in the projection beam path. In a second position, shown in dash-dot lines in FIG. 2, the opening 23 has been moved out of the projection beam path.

Figure 3:
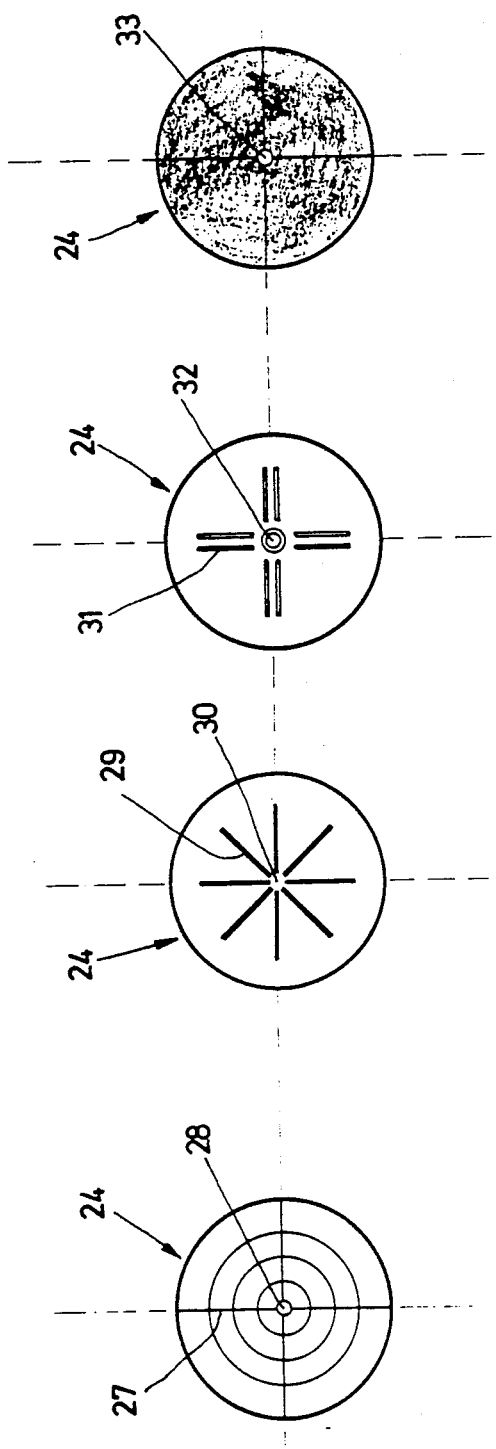
FIGS. 3 A-D show four possibilities of a disk which can be introduced into the path of the projection beam for an exact indication of the position of the grinding wheel carrier.

The disks that can be inserted into opening 23 are designed so that the position of the image 26 produced by them on the screen can be determined with the greatest possible accuracy relative to the nominal contour curve 18. FIG. 3 shows a few possible designs of disk 24. Disks A, B and C allow transmission of the projection light and have lines which identify the center 27 of the disks. In disk A, this is accomplished by two perpendicular lines and by concentric circles around the center 28. In example B, four lines 29 at 45° to each other intersect in a center 30. In example C, two perpendicular marking line pairs 31 are provided which intersect in a center 32.

Example D represents a partly or completely opaque disk for the projection light with a small opening 33 of e.g., 0.1 mm diameter in the center.

In the operating position, lines 27, 29 and 31 of the disks according to examples A, B and C, respectively, are projected on the screen as image 26, so that the location of the respective centers 28, 30 and 32 relative to the nominal contour line 18 can be precisely determined. In example D, the image of opening 33 appears as a bright spot in a dark field and can therefore also be precisely localized.

For storing the path of the nominal contour line 18, the latter is identified at different sites on the screen so that selected points 34 are obtained. Compound table 1 is adjusted by handwheels 19 and 20 so that the center of image 26 of the marker (disk 24) is located exactly on the origin of the nominal contour curve. The corresponding position of the two slides 2 and 3 is then determined by position sensors producing an electrical signal which is then stored in the CNC system. In the same manner, the center of image 26 is subsequently brought to coincide with additional selected points by operating the handwheels 19 and 26, and the coordinates of the carriage positions of compound table 1 are stored each time. The position sensors can be separate sensor means (not shown) or the servomotors 4 and 5 can be used as position sensors. Since any movement of the slides 2 and 3 is performed by these servomotors the CNC system controlling the movement of the servomotors always "knows" their position at any moment.

The ends of straight or circular lines or the breaks between two linear segments can serve as selected points. As soon as the position of these selected points is known to the control system, it can calculate the exact line path between the selected points on the basis of a previously entered program. Then control 21 moves the slides 2 and 3 of compound table 1 and thus the grinding wheel 8 in accordance with this calculation, so that a corresponding profile is ground into the workpiece 10 held on compound table 9.

The precision of the determination of the coordinates of the selected points is extremely high in this method, since the marker is highly magnified by the projection beam path. Moreover, the procedure can be easily and quickly performed by the operating personnel, for the compound table 1 is adjusted by means of handwheels 19 and 20 in the same manner as is done during manual grinding of workpieces.

Example D of disk 24 with the center hole in FIG. 3 is particularly suited for an automatic displacement of slides 2 and 3 of compound table 1 during storage of the data corresponding to the selected points. Because of the design of the disk with a very small central opening, the position of image 26 can be easily scanned with a photo-electric cell which, instead of the handwheels, takes over the displacement of slides 2 and 3 of compound table 1 until the image of the illuminated central opening 33 coincides with the selected point 34 which, as mentioned, can be produced by punching into the nominal curve, so that this point is also brighter than the adjoining areas of the nominal contour curve. At the same time, it is of advantage for the diameter of the image of opening 33 to correspond to the line width of the nominal contour line.

What is claimed is:

1. Method for preparing a CNC controlled projection profile grinder for grinding a desired profile into a workpiece by means of a grinding wheel, said projection profile grinder having its own projection screen and having a carrier which is operable both automatically and manually to cause relative movement between the grinding wheel and the workpiece, and position sensing means associated with the carrier for providing carrier position information to the CNC, characterized in that a contour line corresponding to that of a desired profile for the workpiece is displayed on the projection profile grinder's own projection screen, a marker is disposed on the carrier in predetermined relation to the grinding wheel, an image of the marker is projected onto the projection screen, the carrier is operated manually to cause the image of the marker to move to selected positions along the contour line displayed on the projection screen, and when the image of the marker is at each of said selected points, the corresponding carrier position information from said position sensing means is caused to be stored in said CNC for subsequent usage when the desired profile is to be automatically ground into the workpiece.

2. Method according to claim 1 in which said marker is displaced on said carrier to a different position for conducting the grinding operation on the workpiece from the position used when carrier position information is being caused to be stored in said CNC.

3. Method according to claim 1 in which the image of said marker appearing on the projection screen is substantially magnified from its actual size.

4. Projection profile grinder comprising a holder for a workpiece, a grinding wheel for grinding a desired profile into a workpiece on the holder, a carrier for causing relative displacement between the holder and the grinding wheel, a projection screen, means for projecting an image of the grinding wheel onto the projection screen, means for displaying a desired contour line on the projection screen corresponding to a desired profile to be ground into a workpiece on the holder by operation of said carrier, a CNC system for controlling the grinder operation during a grinding operation, manual control means for manually controlling the carrier at times when automatic operation is not being conducted, and position sensing means associated with the carrier for providing carrier position information to the CNC, characterized in that a marker is provided on the carrier in predetermined relation to the grinding wheel, an image of the marker is projected onto the projection screen, the CNC has stores for storing data from said position sensing means, and means are provided for causing position information from said position sensing means to be stored in stores of said CNC as the carrier is operated by said manual means to selected positions defined by the positioning of the image of said marker at selected points of said contour line with the corresponding information from said position sensing means at each of said selected points being caused to be stored.

5. Projection profile grinder according to claim 4 characterized in that the grinding wheel is mounted on the carrier.

6. Projection profile grinder according to claim 4 characterized in that the marker is selectively operable on the carrier to a first position and to a second position which is different from said first position such that the image of the marker is caused to appear at different points on the projection screen for each position.

7. Projection profile grinder according to claim 6 characterized in that the marker is operable between said first and second positions by a prime mover.

8. Projection profile grinder according to claim 4 characterized by the fact that the marker comprises a holder holding a transparent reticle having lines defining a point.

9. Projection profile grinder according to claim 4 characterized in that the marker comprises a holder holding a disc which has a small hole surrounded by an annular region of opaqueness.

10. Projection profile grinder according to claim 9 characterized by the fact that the hole has a diameter of 0.1 mm.

* * * * *